No. 657,125. Patented Sept. 4, 1900.
A. LINDSAY.
EGG SEPARATOR.
(Application filed Nov. 18, 1899.)
(No Model.)

Witnesses
J. P. Britt
Chas. E. Brock

Inventor
A. Lindsay,
by O. Marat & Co.
Attorneys

THE NORRIS PETERS CO., PHOTO-LITHO., WASHINGTON, D. C.

UNITED STATES PATENT OFFICE.

ALEXANDER LINDSAY, OF WHEELING, WEST VIRGINIA.

EGG-SEPARATOR.

SPECIFICATION forming part of Letters Patent No. 657,125, dated September 4, 1900.

Application filed November 18, 1899. Serial No. 737,492. (No model.)

*To all whom it may concern:*

Be it known that I, ALEXANDER LINDSAY, residing at Wheeling, in the county of Ohio and State of West Virginia, have invented a new and useful Egg-Separator, of which the following is a specification.

Many efforts have been heretofore made to produce a satisfactory utensil for the use of cooks, housewives, and others for dividing the yolks from the whites of eggs with varying success.

It is an object of my invention to provide such an article of cheap construction which shall be strong, reliable, and efficacious for its intended purpose and which shall also be provided with means whereby the eggs to be divided may be broken and their condition ascertained before permitting of the entrance of the inner contents into the divider proper.

Figure 1:
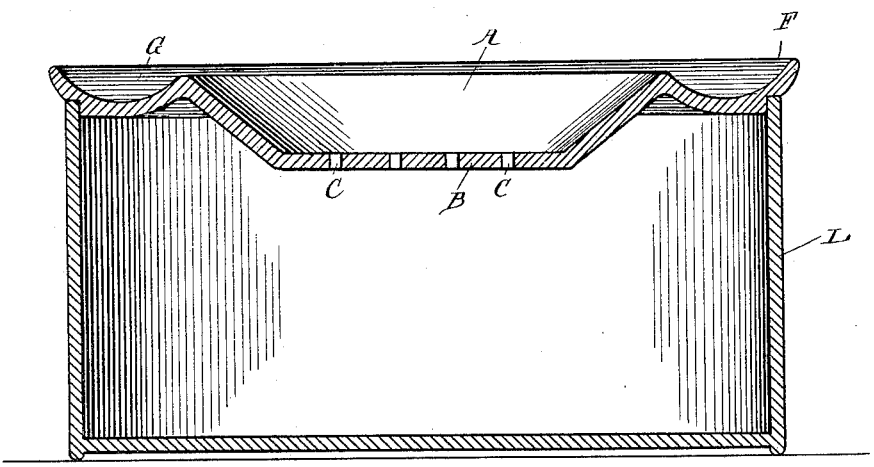
Figure 2:
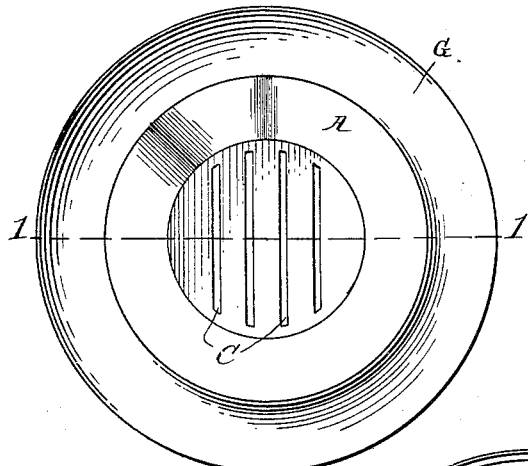
Figure 3:
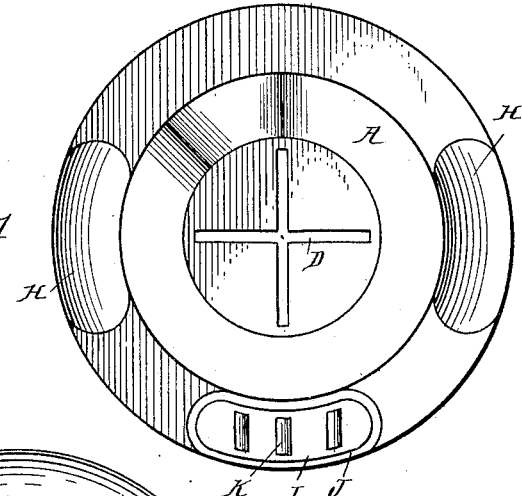
Figure 4:
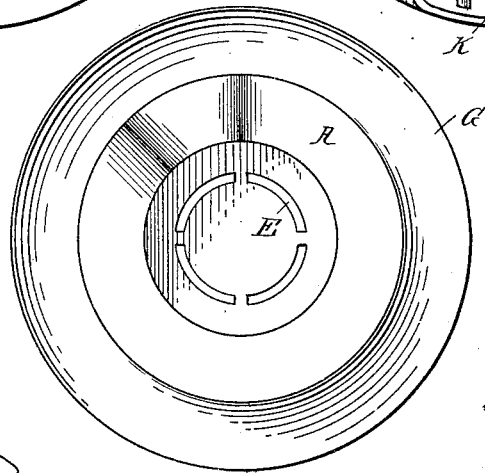

In the drawings forming a part of this specification, Figure 1 is a vertical sectional view on the dotted line 1 1 of Fig. 2, illustrating a device constructed in accordance with my invention mounted on a vessel to receive the albumen or whites of the eggs. Fig. 2 is a top plan view thereof. Figs. 3 and 4 are similar views of modified forms of my invention.

Like letters of reference mark the same parts wherever they appear in the several figures of the drawings.

Referring to the drawings by letters, A indicates the centrally-depressed portion of the saucer-like construction which forms my improved device, the bottom of said depression being provided with slots. The saucer may be of any desired material, glass or pottery being preferred, and of any desired contour, the depression may be, as shown, of the shape of an inverted-cone frustum with flat bottom B, of curved sides and bottom, or of any other approved form, and the slots may be straight and parallel, as at C in Figs. 1 and 2, cruciform, as at D in Fig. 3, curved, as at E in Fig. 4, or of any other desired shape.

F indicates a rim surrounding the central depression A, which rim may be provided with a hollow or curved depression G all the way around, as in Figs. 1, 2, and 4, or in lieu thereof with a similar depression or hollow H, as in Fig. 3, and will also be provided with a depression I, having raised edges J and ribs K, as shown in Fig. 3.

L indicates a cup, bowl, or other vessel over which the device may be placed, as shown in Fig. 1.

In use with the device in position, as in Fig. 1, eggs may be cracked or broken by striking them against the raised edges J or ribs K of depression I. In most instances a very small portion of the contents of the egg will drop out when the egg is cracked and this will fall in depression I, so that it can be ascertained at once whether the egg is good or bad, and if it be a bad one cracked after others had been cracked and divided none of its contents will fall into depression A to be mingled with the good. If the egg is good, the contents are dumped out of the shell into depression A, when the white or albumen will pass through the slots in the bottom into receptacle L, leaving the yolk to be emptied into another receptacle.

The depressions in the rim serve to receive the thumb of the person using the device and facilitate the handling thereof.

By means of this invention, which can be produced, especially in glass or pottery, at a very small cost, the difficulties attending the cracking and dividing of eggs will be overcome and the work of the cook or housewife thereby lightened and facilitated.

Having thus fully described my invention, what I claim as new, and desire to secure by Letters Patent of the United States, is—

1. An egg breaker and divider, consisting of a saucer-like construction, provided with a depressed slotted center, and raised ribs between the depression and the periphery of the divider, substantially as described.

2. An egg breaker and divider consisting of a saucer-like construction provided with a depressed slotted center and a rim with a curved depression therein, sustantially as described.

3. An egg breaker and divider consisting of a saucer-like construction provided with a depressed slotted center, and a depression between the central depression and the periphery and having a ribbed bottom, substantially as described.

4. An egg breaker and divider consisting of a saucer-like construction provided with a depressed slotted center, and a depression between the central depression and the periphery and having raised edges, substantially as described.

5. An egg breaker and divider consisting of a saucer-like construction provided with a depressed slotted center, and a depression between the central depression and the periphery and having raised edges and ribbed bottom, substantially as described.

6. An egg-breaker consisting of a saucer-like construction, provided with a depressed, slotted center and a rim with a curved depression therein, and also with a depression having a raised edge and a ribbed bottom, substantially as described.

ALEXANDER LINDSAY.

Witnesses:
ROBERT LINDSAY,
R. T. McNICHOL.